(12) United States Patent
Sherman (10) Patent No.: US 6,305,273 B1
(45) Date of Patent: Oct. 23, 2001

(54) TOASTER WITH WARMING CHAMBERS

(76) Inventor: Alan Sherman, 12215 Dorsett Rd., St. Louis, MO (US) 63043

(*) Notice: Subject to any disclaimer, the term of this patent is extended or adjusted under 35 U.S.C. 154(b) by 0 days.

(21) Appl. No.: 09/413,138

(22) Filed: Oct. 6, 1999

(51) Int. Cl.[7] ................................................. A47J 37/07
(52) U.S. Cl. .............................. 99/393; 99/389; 99/401
(58) Field of Search ................................ 99/385, 389, 401, 99/393, 391

(56) References Cited

U.S. PATENT DOCUMENTS

| | | |
|---|---|---|
| D. 310,004 | 8/1990 | Storsberg . |
| 2,113,697 * | 4/1938 | Lang ........................................ 99/393 |
| 2,853,936 * | 9/1958 | Parr ......................................... 99/393 |
| 3,587,907 * | 6/1971 | Okuda ..................................... 99/385 |
| 3,603,242 | 9/1971 | Murphy, Sr. . |
| 3,866,525 | 2/1975 | Oxel . |
| 3,906,848 | 9/1975 | Gow . |
| 4,346,651 | 8/1982 | Schickedanz . |
| 4,396,825 | 8/1983 | Cox et al. . |
| 5,427,017 | 6/1995 | Cheung . |
| 5,746,115 | 5/1998 | Yip . |

* cited by examiner

*Primary Examiner*—Curtis Sherrer
*Assistant Examiner*—Hao Mai
(74) *Attorney, Agent, or Firm*—Polster, Lieder, Woodruff & Lucchesi (57) ABSTRACT

A toaster includes a toaster body having a top wall, at least one toasting chamber in the top wall, a bottom, side walls, and end walls. A seat is adjacent to, and extends along at least a portion of one of the side walls (and preferably along both of the side walls). The seat allows toast to be placed in contact with the wall of the toaster to be kept warm by heat radiating through the toaster wall. In one embodiment, the seat is simply an exposed shelf. In another embodiment, the seat forms a bottom surface of an enclosed warming chamber. The warming chamber is defined by an outer wall which is spaced from the toaster body side wall, a top wall, a front wall, a back wall, and the seat. A door is provided to allow access to the chamber. Preferably, the door can be removed from the toaster. The toaster includes oversized controls (a start lever and a darkness control lever) to allow the controls to be easily seen and manipulated. To make the controls even easier to be seen, the color of the control levers will contrast with the color of the toaster body.

11 Claims, 6 Drawing Sheets

TOASTER WITH WARMING CHAMBERS

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

This invention relates generally to toasters, and in particular, to toasters which can provide a number of pieces of warm, freshly toasted bread products at each serving.

Toasters are well known, and have been used for many years to toast bread and other products. Typically, a toaster for use in the home can make two or four slices of toast at a time. However, if there are more than two persons at the meal, or if several sandwiches with toasted bread are being prepared at once, more than four pieces of toasted bread are needed. However, current toasters cannot deliver more than two or four pieces of warm toasted bread at once. Although toasters can be made to toast six, eight, or more pieces of toast, they become too large for use in the home kitchen. Further, such toasters are relatively expensive, both in the cost to purchase the toaster and in the operation of the toaster.

Bread is porous, and thus, sliced bread (from which toast is made) has a very large surface area. Toasted bread thus cools very quickly. As toast cools, it looses much of its moisture. Inasmuch as the moisture content of a food product is important to the sense of taste, toast which has lost a significant portion of its moisture is generally less palatable. Bun warmers have been used to keep toast warm. Because bun warmers enclose toast in a cloth napkin, or the like, neither the heat nor the moisture of the toast escape very quickly, and the toast remains somewhat more palatable. However, it would be desirable to provide a toaster which will keep toasted bread warm while other pieces of bread are being toasted.

Additionally, the side walls of toasters can become hot. If, for example, plastic containers or electrical cords are in contact with the sides of some toasters during use of the toaster, the containers or cords can become damaged. It is thus also desirable to provide a toaster in which the side walls of the toaster are well insulated and thus safe to touch.

BRIEF SUMMARY OF THE INVENTION

Briefly stated, I have developed a new toaster which will keep toasted food items warm while additional food items are being toasted. The toaster includes a toaster body having a top wall, at least one toasting well in the top wall, a bottom wall, side walls, and end walls. A ledge or seat extends along at least a portion of one of the side walls (and preferably along both of the side walls). Toast can be placed on the ledge or seat so that the toast will be in contact with the wall of the toaster to be kept warm by heat radiating through the toaster wall. In one embodiment, the seat is simply an exposed shelf. In another embodiment, the seat forms the bottom surface or wall of an enclosed warming chamber. The warming chamber is defined by an outer wall which is spaced from the toaster body side wall, a top wall, a front wall, a back wall, and the seat. A door or access panel is provided to allow access to the chamber. Preferably, the door can be removed from the toaster so that the warming chamber can be cleaned.

When the toaster includes the exposed shelf, previously toasted food items will be kept warm by heat which is conducted through the side wall of the toaster while the toaster is being operated to toast additional pieces of toast. The toast will be placed on the shelf to be in heat transfer relationship with the wall so that the heat conducted through the wall will reach the toast.

When the toaster includes a warming chamber, the chamber will retain the latent heat or residual warmth of the toast. Additionally, because the chamber is closed, and because the chamber is only slightly larger than the toast, the toast will substantially retain the moisture in the toast even if no further toasting is undertaken. If the toaster is operated while toast is in the warming chamber, heat will be conducted through the toaster body wall to help keep the food item warm.

Whether to toaster includes the shelf or the chamber, the toaster can also be used to warm chilled products (i.e., bread from the refrigerator) without baking or toasting the product. The toaster will warm such products more quickly and effectively than an oven, and at less operating cost than if an oven were used.

The toaster additionally includes oversized controls (a start lever and a darkness control lever) to allow the controls to be easily seen by someone who has limited or impaired vision or reduced dexterity. To further make the controls stand out, the controls are preferably a different color than the toaster.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what I presently believe is the best mode of carrying out the invention.

Figure 5:
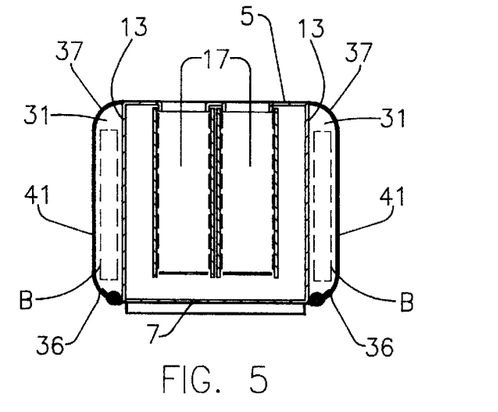
FIG. 5 is a cross-sectional view of the toaster taken along line 5—5 of FIG. 2.
Figure 6:
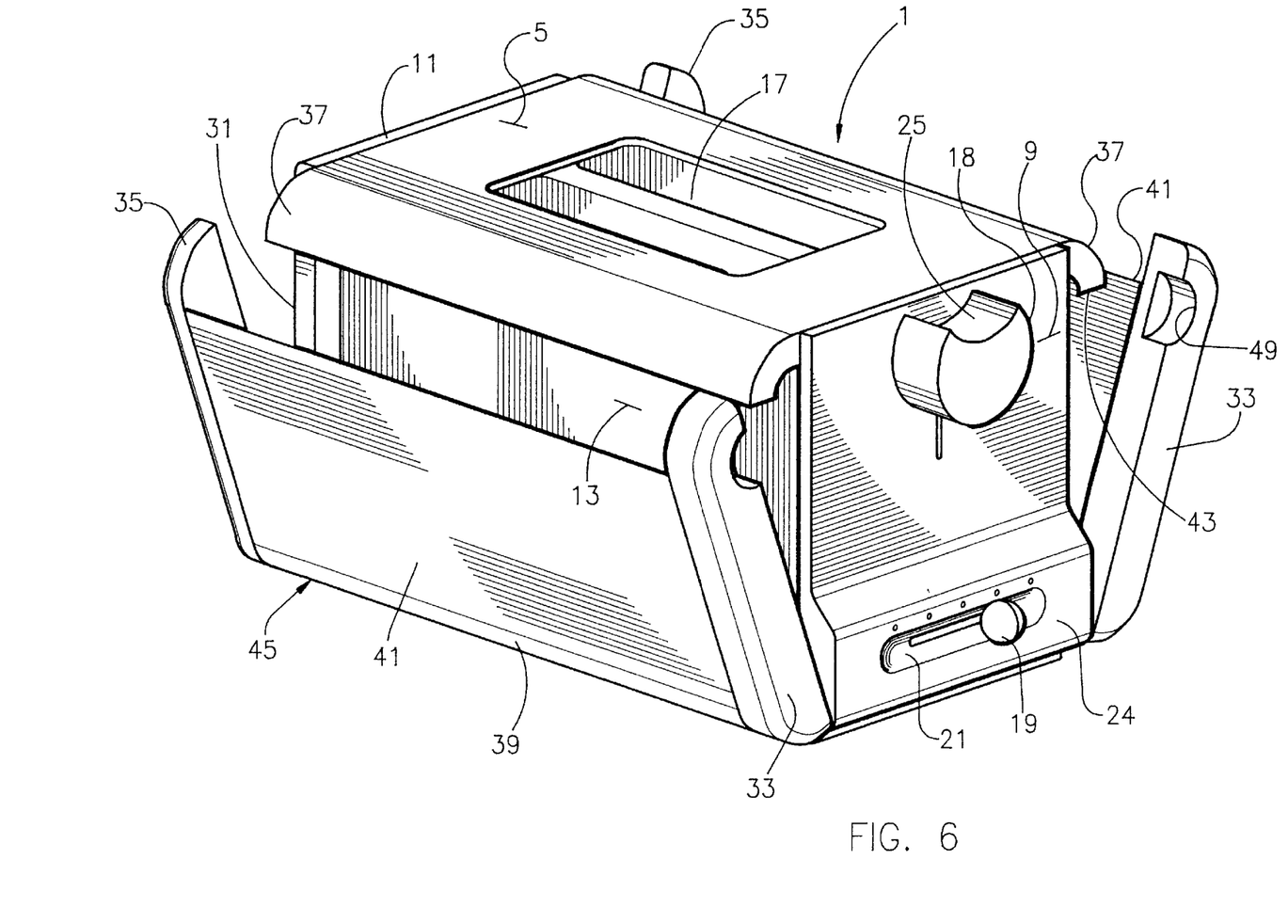
FIG. 6 is a perspective view of the toaster with the doors to the warming chambers opened.
Figure 7:
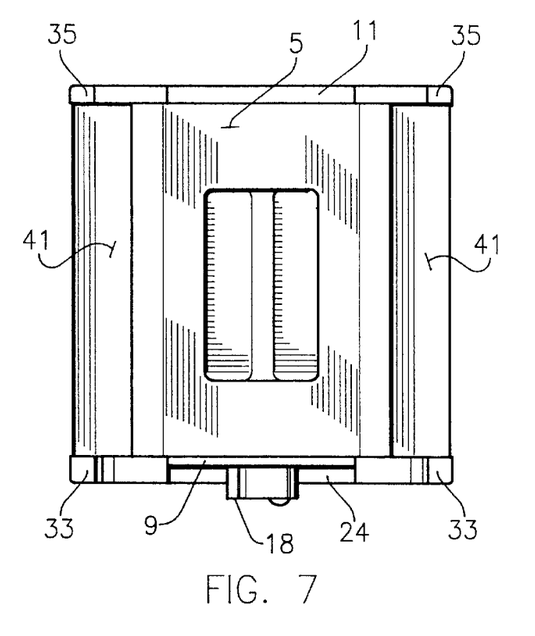
FIGS. 7–9 are top, bottom, and side views of the toaster with the warming chamber doors opened.
Figure 8:
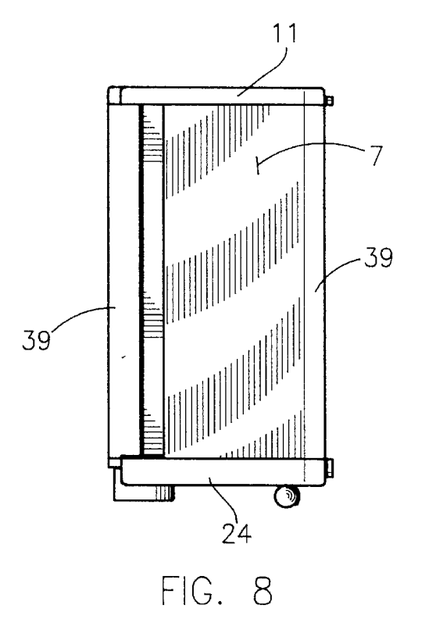
Figure 9:
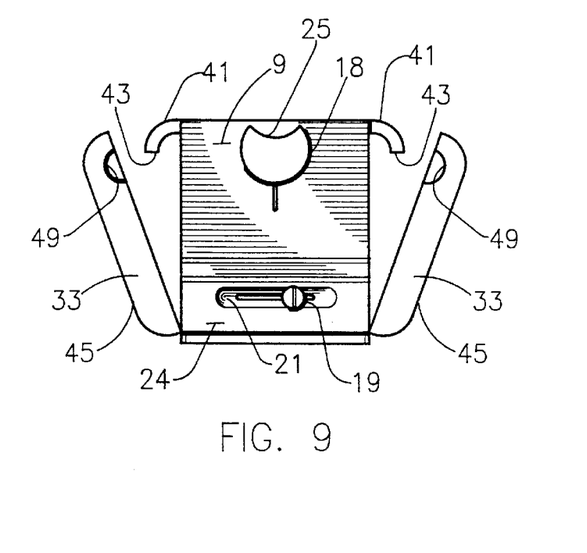

A toaster 1 of the present invention includes a toaster body 3 having a toaster top 5, a toaster bottom 7, a toaster front wall 9, a toaster back wall 11, and toaster side or warming walls 13 (FIG. 5). A pair of toasting wells 17 extend down from the top 5 of the toaster, generally in the center of the body 3. As is known, the toasting wells include resistance wires or heating coils which toast the bread. Preferably, the wells 17 are sized to receive wide pieces of bread (i.e., one-half of a bagel) and to receive larger pieces of bread (i.e., bakery bread or home baked bread). A start lever 18 is placed on the toaster front wall 9 to activate the toaster. A control lever 19 is positioned below the start lever 18 to adjust the darkness of the toast. The control lever 19 is positioned in a small channel 21 which includes indicators 23 indicative of the darkness of each setting. The control lever 19 extends from the outer surface of a control area 24, which is positioned at the bottom of the toaster front wall 9. As is known, the control area 24 contains the system for controlling the toasting cycle (i.e., the length of the toasting cycle).

Preferably, the start and control levers are large or oversized and easy to see so that the toaster may be easily operated by someone who, for example, has limited or impaired vision or reduced motor skills. In the drawings, the start lever 18 is shown as a large circular disk with a cutout in the top of the lever. The control lever 19 is shown to be a large spherical knob. Obviously, other shapes could be used which would accomplish the same goal. The large size of the control levers 18 and 19 make them easy to see and manipulate, as compared to smaller levers on some commonly available toasters. To make the controls 18 and 19 even easier to see, they are preferably a different color than the color of the toaster body, and preferably a color which will contrast with the color of the toaster body 3.

Figure 11:
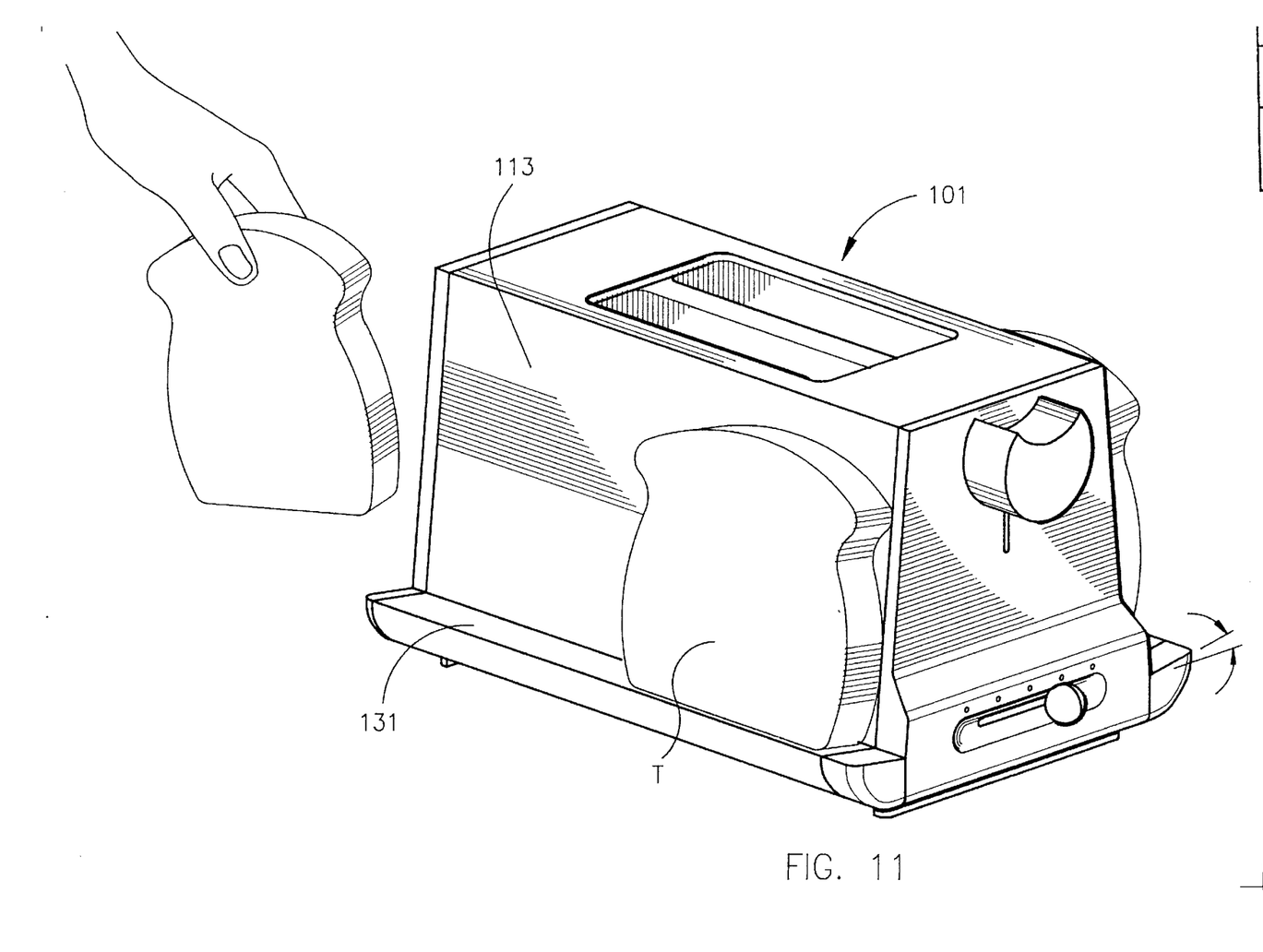
FIG. 11 is a perspective view of an alternative embodiment of the toaster that does not include the warming chamber doors.

Warming chambers 31 (FIG. 5) are formed on either side of the toaster body 3. The chambers 31 preferably extend the length of the toaster body side walls 13. Each warming chamber 31 is defined by its associated toaster body side wall 13 (which defines a chamber inner wall), a chamber front wall 33, a chamber back wall 35, a chamber top wall 37, a chamber bottom wall 39, and a chamber outer or side wall 41. The toaster side walls (or chamber inner walls) 13 are continuous, uninterrupted walls which extend between the front and back walls of the toaster body 3 and chamber 31. The toast or bread sits on the chamber bottom wall 39 when placed in the chamber. The chamber bottom wall 39 thus defines a seat. The chamber 31 encloses or surrounds the bread and is preferably sized so that there will only be a small air space around the toasted bread B which is received in the warming chamber. Thus, the chamber has a width between the chamber outer wall 41 and the toaster side wall 13 slightly greater than the width of the toast to be received in the chamber and at least as deep as the height of the toast to be placed in the chamber. As seen in FIG. 11 (which shows an alternate embodiment discussed below), the warming chamber preferably has a front-to-back length sufficient to hold two pieces of toast. The small size of the air space will help minimize the heat and moisture that is lost from the bread. Thus, the toast's own residual heat and moisture content will be better retained. The toast will also be kept warm by heat from the operation of the toaster. Heat from the toaster's resistance wires will be conducted through the toaster body side walls 13 and will radiate from the side walls into the chamber 31. To facilitate the transfer of heat from the resistance wires through the side walls and into the chambers 31, the side walls are not insulated and are made from a heat conductive material. Hence, the toaster body side walls 13 are warming walls.

The walls of the chamber can be configured in many different ways. In the illustrative embodiment shown in the Figures, the chamber top wall 37 is a continuation of the toaster body top wall 5. The chamber top wall 37 is formed as a curved member which defines approximately a quarter circle, and which has a bottom 43. The curved member bottom 43 faces generally downwardly. The chamber bottom wall 39 is also shown to be curved. That is, the bottom wall curves around to form a smooth transition between the bottom wall and the chamber outer wall 41. The chamber outer wall 41 extends up from the chamber bottom wall 39 to meet the chamber top wall 37 at the bottom 43 of the top wall when the chamber is closed.

Figure 2:
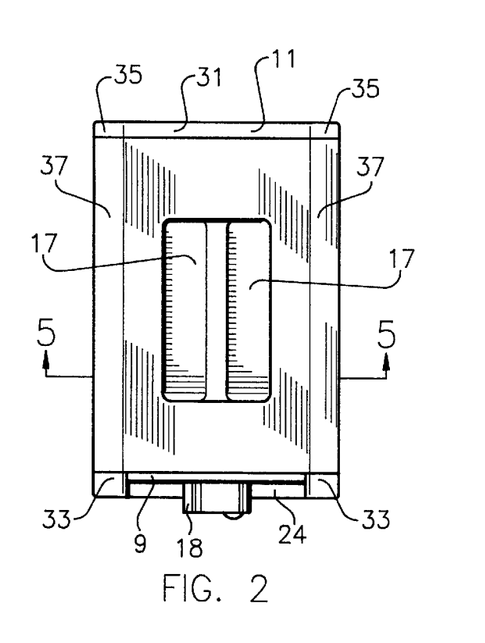
FIGS. 2–4 are top, bottom, and side views of the toaster.
Figure 3:
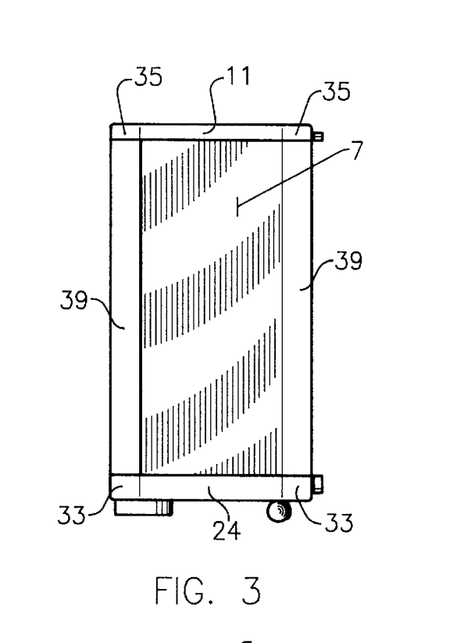
Figure 4:
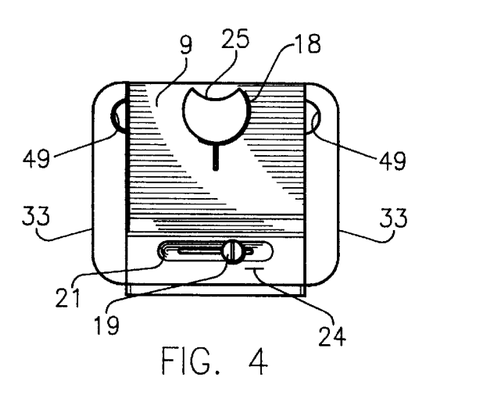

The chamber's back wall 35 has a width approximately equal to the width of the toaster back wall 1, so that the outer surface of the chamber back wall 35 will be flush with the outer surface of the toaster back wall 11, as seen in FIGS. 2 and 3. The chamber front wall 33 has a width that is greater than the toaster front wall 9, but is substantially equal to the width of the control area 24.

The chamber 31 can be opened so that the chamber can be accessed so that toast can be placed in, and removed from, the chamber 31. In the illustrative embodiment, shown in the Figures, the chamber bottom 39, chamber outer wall 41, chamber front wall 33, and chamber back wall 35 are formed as a door assembly 45 which is pivotally mounted to the toaster body 3. The door assembly 45 pivots about the chamber bottom wall 39 as described below so that toast can be inserted into the chamber from the top of the toaster 1. The door assembly 45 can then be closed to close the toast in the chamber. The chamber front wall 33 is provided with cut-outs 49 near the tops of the chamber front walls 33. These cut-outs define finger grasps which facilitate opening of the chamber 31. The cut-outs 49 can be replaced with knobs, or if desired, can be eliminated.

Figures 10, 10A:
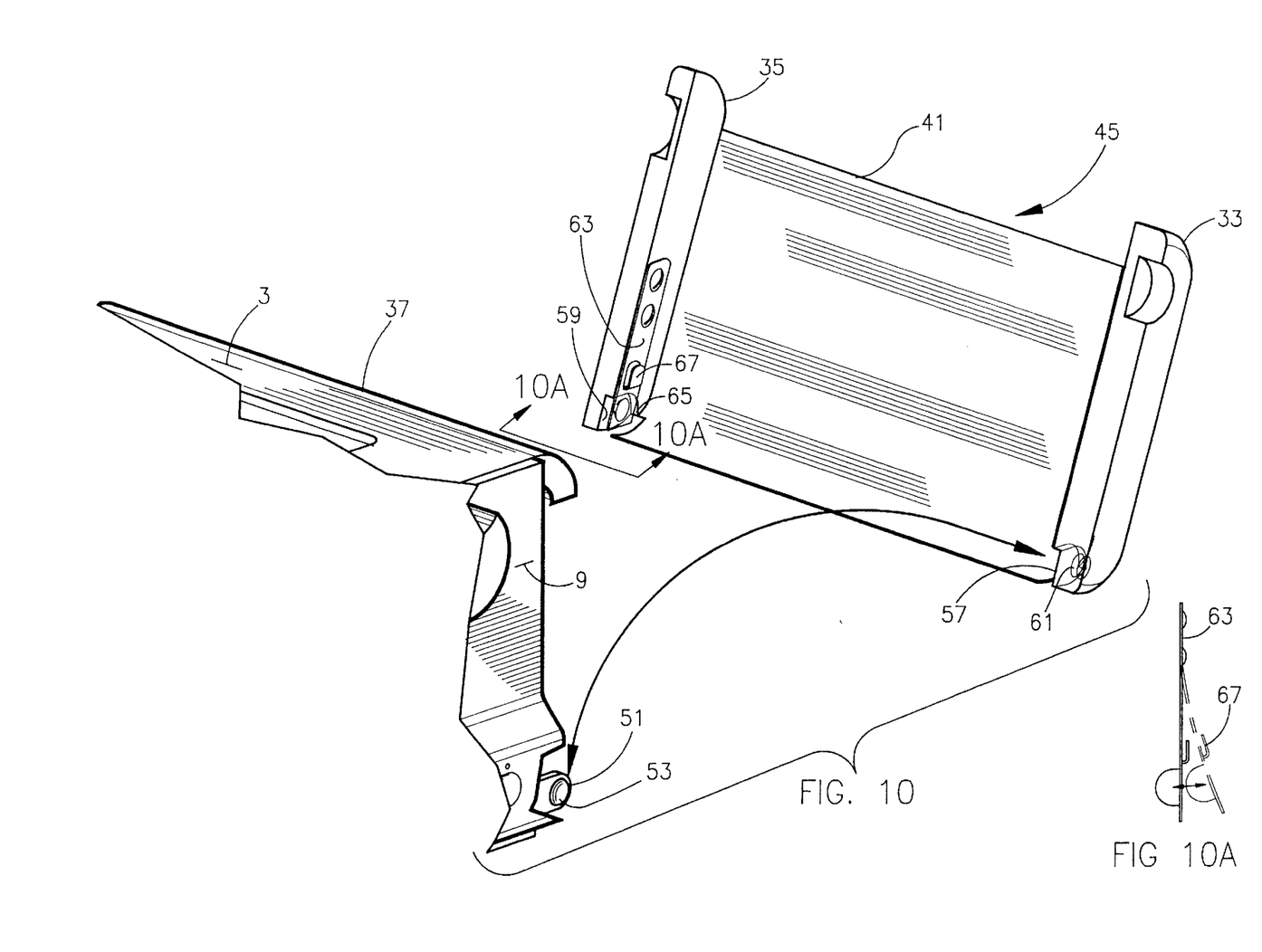
FIG. 10 is an exploded perspective view showing an illustrative embodiment of a removable door which defines the warming chamber of the toaster.
FIG. 10A is a cross-sectional view taken along line 10—10 of FIG. 10 showing a leaf spring which enables the door to be removed from the toaster body; the leaf spring being shown in two positions.

The doors 45 are preferably removably mounted to the toaster body 3. This will allow for easy access to the chamber's inner surfaces so that they may be easily cleaned. Items placed in the chamber may include cheese, fruit, or other fillings, as well as icing, raisins, etc. Or, simply, crumbs will accumulate in the chamber. It is thus important, and desirable, to be able to easily clean the chamber before these items become baked onto the surfaces of the chamber. An illustrative embodiment of an easily removable door 45 is shown in FIGS. 10 and 10A. As seen in FIG. 10, the toaster body is provided with a short arm 51 at the bottom of the toaster body and which extends outwardly from the toaster body. The arm 51 has a small button 53 which faces outwardly. Although only the arm 51 on the toaster front wall 9 is shown, there is an identical arm on the toaster body back wall 11. The chamber front wall 33 and chamber back wall 35 of the door 45 include rectangular notches 57 and 59 at the bottom of the walls. The notch 57 includes a hole 61. A leaf spring 63 is secured to the inner surface of the chamber back wall 35. The leaf spring 63 extends to the bottom of the chamber back wall 35 and includes a hole 65. The leaf spring 63 is positioned on the chamber back wall 35 such that the leaf spring hole 65 is aligned with the front wall notch hole 61. The holes 61 and 65 are positioned to received the buttons 53 of the toaster body arms 51. The doors 45 can thus pivot about the buttons 53. To remove the door 45 from the toaster body 3, the leaf spring 63 is flexed inwardly, as seen in FIG. 10A to pull the leaf spring 63 off the button 53, such that the button 53 is no longer received in the leaf spring hole 65. The leaf spring includes a handle or grasp 67 to facilitate flexing of the leaf spring. Once the leaf spring is removed from the button 53, the door 45 can be pulled away from the toaster back wall button 53 and simply pulled off the toaster front wall button 53. The door 45 is placed back on the toaster body in just the opposite manner.

The toaster 1 is preferably sized, from front to back, so that the warming chambers 31 can each receive two slices of bread in a side-by-side relationship. The chambers 31 have a depth sufficient to accommodate one piece of bread. Thus, between the two warming chambers 31, four pieces of bread can be kept warm while an additional two pieces of bread are toasted. Thus, six pieces of warm, toasted bread can be served at a single time when a two-slice toaster is used. If desired, either the depth or width of the chamber can be changed to alter the number of pieces which can be held in the chamber at a single time. For instance, in a four-slice toaster, the side walls are longer, and the chambers could each accept three pieces of toast, as compared to two pieces of toast for the two-slice toaster. Thus, a four-slice toaster could provide up to ten pieces of warm, toasted product at a single time.

The warming chambers 31 provide several functions. First and foremost, toasted bread can be placed in the chambers 31 to be kept wann while additional pieces of bread are toasted or while additional items for a meal are being prepared. The already toasted bread will be kept warm in part by the toasted bread's own heat. This is passive warming of the bread. However, as noted above, heat will be conducted through the toaster side walls 13 to help heat the chambers 31 while the toaster is in use (i.e., while further bread is being toasted). Additionally, because the warming chambers 31 are closed while in use, the moisture in the toast will not readily escape, and the toast will remain moist (i.e., will not dry out) to remain palatable to a diner. Toast that is warmed, for example, on a warming rack or a hot plate, or in an oven, will lose this moisture and will dry out.

Additionally, the chambers 31 create an air space between the toaster side walls 13 and the chamber outer walls 41. The air within the chamber 31 is substantially stagnant, and, the heat from the toaster body side walls will not be readily transferred to the chamber outer walls 41. Thus, the chamber outer walls 41 will remain relatively cool, and will not be too hot to the touch. The cooler surfaces 41 of the chamber 31 will enable the toaster 1 to be used in closer proximity to appliances having thermoplastic parts without the fear that such appliances might get damaged by the heat of the toaster.

Figure 1:
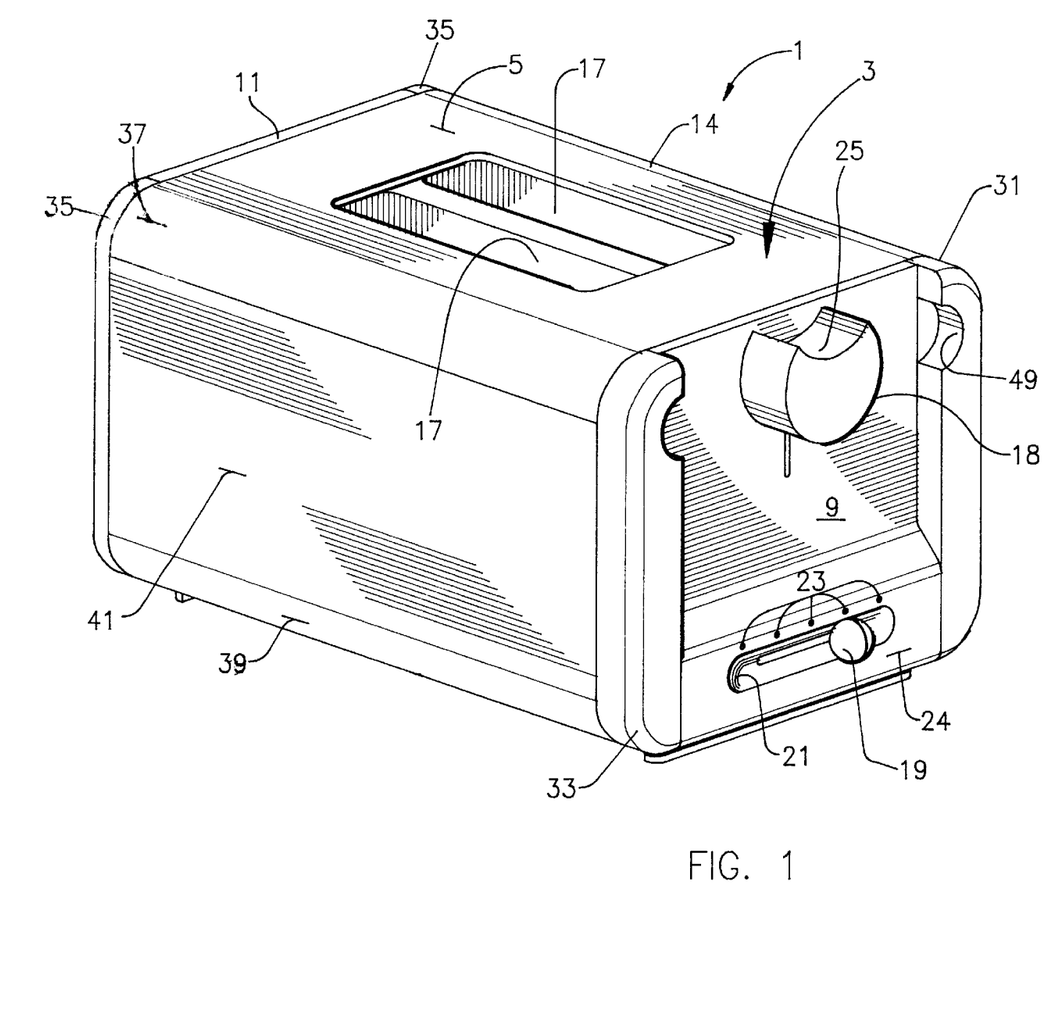
FIG. 1 is a perspective view of a toaster of the present invention.

An alternative embodiment of the toaster is shown in FIG. 11. The toaster 101 of FIG. 11 is generally the same as the toaster 1 of FIG. 1. However, it omits the doors 45. Instead, the side walls 113 of the toaster body are sloped upwardly and inwardly, such that the toaster body is generally trapezoidal in end view. The shape could also be defined as a truncated triangle. At the bottom of the toaster side walls 113, the toaster 101 includes a narrow shelf 131 which extends the length of the toaster. Preferably, the shelf is angled from the horizontal, such that the toast T, when placed on the shelf, will lean against the toaster body side wall 113. The shelf 131 is sized to hold two pieces of bread in a side-by-side relationship. As can be appreciated, the slope of the side walls 113 facilitates easy placement of the toast T on the shelves 131. The toaster 101 loses the effect of the warming chamber 31 of the toaster 1. However, because the toast T is in contact with the side walls 113 while additional slices of bread are being toasted, the heat conducted through the toaster side walls 113 will keep the toast T warmer than if the toast were simply placed on a plate.

As various changes could be made in the above constructions without departing from the scope of the invention, it is intended that all matter contained in the above description or shown in the accompanying drawings shall be interpreted as illustrative and not in a limiting sense. Although bread and toast are generally discussed above, it will be apparent that the toaster 3 and its warming chamber 31 and warming shelf 131 can be used for other products capable of being heated in toasters. The door can be made in other manners. For example, the chamber top 37 could be mounted to the chamber outer wall 41 instead of being part of the toaster body. The door 45 could pivot from the toaster front or back walls instead of the toaster bottom wall. The chamber alternatively could have an envelope type construction, with a bottom portion which includes the chamber bottom, part or all of the chamber front and back, and part of the chamber side wall and a top portion which includes the rest of the chamber side wall, and possibly some of the chamber front and back walls. In this instance, the top portion of the chamber would pivot around an axis parallel with the top side edge of the toaster body. The door configuration affects the manner in which the door is hinged to the toaster body and the manner in which the door is removably mounted to the toaster body. These examples are merely illustrative.

What is claimed is:

1. A toaster comprising a toaster body having a toaster top, a toaster bottom, a toaster front wall, a toaster back wall, and toaster side walls, at least one toasting well in the body sized to receive a bread product for toasting or heating, a resistance wire adjacent said toasting well to toast or heat the bread product received in the toasting well; at least one of said toaster walls being a warming wall; said warming wall defining a continuous, uninterrupted surface and being made of a heat conductive material; a seat upon which a bread product can sit adjacent said warming wall and extending along said warming wall; the seat being positioned on a first side of said warming wall and said resistance wire being on a second, opposite, side of said warming wall; and a warming chamber to receive said bread product, the warming chamber being defined by a chamber front wall, a chamber back wall, a chamber outer wall, said toaster warming wall, a chamber top wall, and said seat; the toaster including a door to said chamber, said door being movable between an opened position in which a bread product can be placed in or removed from said chamber, and a closed position in which said warming chamber is closed.

2. The toaster of claim 1 wherein the chamber is sized so that there is an air space around bread products when placed in the chamber.

3. The toaster of claim 1 wherein the chamber door is removably mounted to the toaster body.

4. The toaster of claim 1 wherein the warming wall comprises at least one of the toaster body side wall; the warming chamber being adjacent at least one of the toaster body side walls.

5. The toaster of claim 4 wherein both of said toaster side walls comprise warming walls, there being a warming chamber adjacent each of said side walls.

6. The toaster of claim 1 including a start lever to activate the toaster and a control lever to control the toasting of the bread product in the toaster; the start and control levers being a color different from the color of the toaster body wall on which the controls are positioned.

7. The toaster of claim 6 wherein the color of the start lever and control lever contrasts with the color of the toaster wall on which the controls are positioned.

8. A toaster for toasting or heating a bread product; the toaster including:

a toaster body having a toaster top wall, at least one toasting well in the top wall, a toaster bottom wall, toaster side walls, and toaster front and back walls; at least one of said toaster walls being a warming wall through which heat is conducted;

at least one warming chamber extending along at least a portion said warming wall, said chamber being openable to receive or remove a bread product from the chamber, and closable; the warming chamber being defined by an outer wall spaced from the toaster body warming wall, a chamber top wall, a chamber front wall, a chamber back wall, and a chamber bottom; said warming wall being a continuous, uninterrupted wall; said warming chamber being warmed passively by heat conducted through said warming wall, the chamber, when closed, reducing drying of the food item in the chamber; and a door to said at least one warming chamber; said door being movable between an opened position to allow said food item to be placed in and removed from said warming chamber and a closed position in which said chamber is closed.

9. The toaster of claim 8 wherein the chamber door is removably mounted to the toaster.

10. The toaster of claim 8 wherein said warming chamber defines an insulative barrier between said toaster body side wall and said chamber outer wall.

11. The toaster of claim 8 wherein the chamber is sized so that there is a space around food items when food items are placed in the chamber.

* * * * *